(12) United States Patent
Leveau-Mollier

(10) Patent No.: US 12,447,262 B2
(45) Date of Patent: Oct. 21, 2025

(54) KIT FOR WASHING AN INTESTINAL ANASTOMOSIS IN SITU

(71) Applicant: SafeHeal SAS, Paris (FR)

(72) Inventor: Séverine Leveau-Mollier, Bievres (FR)

(73) Assignee: SafeHeal SAS, Paris (FR)

( * ) Notice: Subject to any disclaimer, the term of this patent is extended or adjusted under 35 U.S.C. 154(b) by 982 days.

(21) Appl. No.: 17/618,715

(22) PCT Filed: May 27, 2020

(86) PCT No.: PCT/FR2020/050889
§ 371 (c)(1),
(2) Date: Dec. 13, 2021

(87) PCT Pub. No.: WO2020/260784
PCT Pub. Date: Dec. 30, 2020

(65) Prior Publication Data
US 2022/0240938 A1    Aug. 4, 2022

(30) Foreign Application Priority Data
Jun. 24, 2019   (FR) ...................... 1906808

(51) Int. Cl.
*A61M 3/02* (2006.01)
*A61B 17/11* (2006.01)
(Continued)

(52) U.S. Cl.
CPC ....... *A61M 3/0279* (2013.01); *A61B 17/1114* (2013.01); *A61M 1/77* (2021.05);
(Continued)

(58) Field of Classification Search
CPC .... A61M 3/0279; A61M 1/77; A61M 3/0283; A61M 3/0262; A61M 3/027;
(Continued)

(56) References Cited

U.S. PATENT DOCUMENTS 3,799,172 A    3/1974   Szpur
3,885,567 A    5/1975   Ross
(Continued)

FOREIGN PATENT DOCUMENTS

CN    102387759 A    3/2012
CN    103370016 A    10/2013
(Continued)

OTHER PUBLICATIONS

Search Report and Written Opinion from corresponding FR Application No. 1906808, Feb. 18, 2020.
(Continued)

*Primary Examiner* — Bhisma Mehta
*Assistant Examiner* — Haden Matthew Ritchie
(74) *Attorney, Agent, or Firm* — Greenberg Traurig, LLP; Christopher C. Bolten; Albert K. Heng

(57) ABSTRACT

A kit including a device for intestinal anastomosis enema in situ, and an anastomosis protection device comprising a flexible external sheath connected to a stent located downstream of the sheath and designed to be anchored upstream of the anastomosis. The enema device has: a perforated, tubular element of annular shape that can distribute an enema composition, upstream of the anastomosis, a supply tube one end of which emerges in the tubular element and one end of which is open to injection means designed to deliver the composition into said tubular element, holding means for the tubular element upstream of the anastomosis.

20 Claims, 3 Drawing Sheets

(51) Int. Cl.
*A61M 1/00* (2006.01)
*A61F 2/04* (2013.01)

(52) U.S. Cl.
CPC ..... *A61M 3/0283* (2013.01); *A61B 2217/007* (2013.01); *A61F 2002/045* (2013.01); *A61M 3/0262* (2013.01)

(58) Field of Classification Search
CPC ........ A61M 2210/1064; A61B 17/1114; A61B 2217/007; A61F 2002/045; A61F 2220/0008; A61F 5/442; A61F 2/04
See application file for complete search history.

(56) References Cited

U.S. PATENT DOCUMENTS

| | | | |
|---|---|---|---|
| 4,627,837 A | 12/1986 | Gonzalo | |
| 4,716,900 A | 1/1988 | Ravo et al. | |
| 4,721,109 A | 1/1988 | Healey | |
| 5,425,739 A | 6/1995 | Jessen | |
| 5,534,007 A | 7/1996 | St. Germain et al. | |
| 5,558,642 A | 9/1996 | Schweich, Jr. et al. | |
| 5,594,038 A | 1/1997 | Kobayashi et al. | |
| 6,068,636 A | 5/2000 | Chen | |
| 6,325,798 B1 | 12/2001 | Edwards et al. | |
| 6,398,758 B1 | 6/2002 | Jacobsen et al. | |
| 6,514,282 B1 | 2/2003 | Inoue | |
| 6,585,926 B1 | 7/2003 | Mirzaee | |
| 6,733,519 B2 | 5/2004 | Lashinski et al. | |
| 6,808,492 B2 | 10/2004 | Snyder | |
| 6,926,724 B1 | 8/2005 | Chu | |
| 7,025,791 B2 | 4/2006 | Levine et al. | |
| 7,147,627 B2 | 12/2006 | Kim et al. | |
| 7,267,694 B2 | 9/2007 | Levine et al. | |
| 7,267,794 B2 | 9/2007 | Amick | |
| 7,316,716 B2 | 1/2008 | Egan | |
| 7,347,875 B2 | 3/2008 | Levine et al. | |
| 7,509,175 B2 | 3/2009 | Sparks et al. | |
| 7,547,312 B2 | 6/2009 | Bauman et al. | |
| 7,643,887 B2 | 1/2010 | Imran | |
| 7,678,090 B2 | 3/2010 | Risk, Jr. et al. | |
| 7,766,973 B2 | 8/2010 | Levine et al. | |
| 7,776,081 B2 | 8/2010 | Zuidema et al. | |
| 7,815,591 B2 | 10/2010 | Levine et al. | |
| 8,083,758 B2 | 12/2011 | Hsu et al. | |
| 8,114,045 B2 | 2/2012 | Surti | |
| 8,118,774 B2 | 2/2012 | Dann et al. | |
| 8,167,859 B2 | 5/2012 | Shah et al. | |
| 8,182,527 B2 | 5/2012 | Llanos et al. | |
| 8,187,254 B2 | 5/2012 | Hissink et al. | |
| 8,211,186 B2 | 7/2012 | Belhe et al. | |
| 8,282,598 B2 | 10/2012 | Belhe et al. | |
| 8,323,229 B2 | 12/2012 | Shin et al. | |
| 8,398,669 B2 | 3/2013 | Kim | |
| 8,491,612 B2 | 7/2013 | Stopek et al. | |
| 8,597,224 B2 | 12/2013 | Vargas | |
| 8,636,810 B2 | 1/2014 | Rousseau | |
| 8,690,817 B2 | 4/2014 | Assaf et al. | |
| 8,702,641 B2 | 4/2014 | Belhe et al. | |
| 8,702,642 B2 | 4/2014 | Belhe et al. | |
| 8,753,407 B2 | 6/2014 | Nguyen | |
| 8,801,647 B2 | 8/2014 | Melanson et al. | |
| 8,821,429 B2 | 9/2014 | Vargas | |
| 8,828,090 B2 | 9/2014 | Terliuc | |
| 8,900,268 B2 | 12/2014 | Weidenhagen et al. | |
| 8,926,593 B2 | 1/2015 | Croizat et al. | |
| 9,044,300 B2 | 6/2015 | Belhe et al. | |
| 9,173,734 B2 | 11/2015 | Vargas | |
| 9,265,640 B2 | 2/2016 | Harris et al. | |
| 9,339,272 B2 | 5/2016 | Khosrovaninejad | |
| 9,398,982 B2 | 7/2016 | Kleiner | |
| 9,402,630 B2 | 8/2016 | Stopek et al. | |
| 9,511,208 B2 | 12/2016 | Assaf et al. | |
| 9,675,360 B2 | 6/2017 | Baker | |
| 9,687,334 B2 | 6/2017 | Williams et al. | |
| 9,750,596 B2 | 9/2017 | Levine et al. | |
| 9,789,291 B2 | 10/2017 | Assaf et al. | |
| 9,827,135 B2 | 11/2017 | Fong et al. | |
| 9,980,727 B2 | 5/2018 | Khosrovaninejad | |
| 10,456,138 B2 | 10/2019 | Khosrovaninejad | |
| 10,835,248 B2 | 11/2020 | Khosrovaninejad | |
| 12,042,148 B2* | 7/2024 | Khosrovaninejad ........................ A61F 5/0013 | |
| 2004/0044358 A1 | 3/2004 | Khosravi et al. | |
| 2004/0107004 A1 | 6/2004 | Levine et al. | |
| 2004/0122527 A1 | 6/2004 | Imran | |
| 2005/0004663 A1 | 1/2005 | Llanos et al. | |
| 2005/0228409 A1 | 10/2005 | Coppi | |
| 2005/0255230 A1 | 11/2005 | Clerc et al. | |
| 2005/0256587 A1 | 11/2005 | Egan | |
| 2006/0064120 A1 | 3/2006 | Levine et al. | |
| 2006/0112536 A1 | 6/2006 | Herweck et al. | |
| 2007/0032879 A1 | 2/2007 | Levine et al. | |
| 2007/0045229 A1 | 3/2007 | Keenan et al. | |
| 2007/0262161 A1 | 11/2007 | Davies | |
| 2007/0282452 A1 | 12/2007 | Weitzner et al. | |
| 2008/0033244 A1 | 2/2008 | Matsui et al. | |
| 2008/0039878 A1 | 2/2008 | Williams et al. | |
| 2008/0161717 A1 | 7/2008 | Gertner | |
| 2008/0167606 A1 | 7/2008 | Dann et al. | |
| 2008/0195226 A1 | 8/2008 | Williams et al. | |
| 2008/0208325 A1 | 8/2008 | Helmus et al. | |
| 2008/0208357 A1 | 8/2008 | Melanson et al. | |
| 2008/0255592 A1 | 10/2008 | Hsu et al. | |
| 2009/0018606 A1 | 1/2009 | Sparks et al. | |
| 2009/0220677 A1 | 9/2009 | Clerc et al. | |
| 2009/0276055 A1 | 11/2009 | Harris et al. | |
| 2010/0010519 A1 | 1/2010 | Stopek et al. | |
| 2011/0202084 A1 | 8/2011 | Hoem et al. | |
| 2011/0295288 A1 | 12/2011 | Khosrovaninejad | |
| 2012/0095541 A1 | 4/2012 | Kramann | |
| 2013/0006382 A1 | 1/2013 | Behan | |
| 2013/0087597 A1 | 4/2013 | Shelton, IV et al. | |
| 2013/0158463 A1* | 6/2013 | Assaf ................. A61B 17/1155 604/8 | |
| 2013/0274717 A1 | 10/2013 | Dunn | |
| 2013/0304101 A1 | 11/2013 | Stopek et al. | |
| 2014/0088622 A1 | 3/2014 | Rousseau | |
| 2014/0118029 A1 | 5/2014 | Tseng et al. | |
| 2014/0163664 A1 | 6/2014 | Goldsmith | |
| 2014/0222039 A1 | 8/2014 | Khosrovaninejad | |
| 2014/0350694 A1 | 11/2014 | Behan | |
| 2014/0371870 A1 | 12/2014 | Terliuc | |
| 2015/0045715 A1 | 2/2015 | Assaf et al. | |
| 2016/0220256 A1 | 8/2016 | Khosrovaninejad | |
| 2017/0027729 A1 | 2/2017 | Abu Dayyeh | |
| 2017/0071780 A1 | 3/2017 | Fong et al. | |
| 2017/0087343 A1 | 3/2017 | Assaf et al. | |
| 2017/0189217 A1 | 7/2017 | Folan et al. | |
| 2017/0265849 A1 | 9/2017 | Assaf et al. | |
| 2018/0235631 A1 | 8/2018 | Khosrovaninejad | |
| 2021/0008336 A1 | 1/2021 | Rajagopalan et al. | |
| 2021/0038224 A1 | 2/2021 | Khosrovaninejad | |
| 2021/0315578 A1 | 10/2021 | Khosrovaninejad et al. | |

FOREIGN PATENT DOCUMENTS

| | | |
|---|---|---|
| CN | 103764069 A | 4/2014 |
| CN | 204169953 U | 2/2015 |
| CN | 108261577 A | 7/2018 |
| EP | 1405612 A1 | 4/2004 |
| EP | 2143389 A1 | 1/2010 |
| EP | 2165665 A1 | 3/2010 |
| EP | 2143388 B1 | 6/2011 |
| EP | 1556097 B1 | 8/2011 |
| EP | 1746941 B1 | 11/2011 |
| EP | 2395942 A1 | 12/2011 |
| EP | 2347723 B1 | 12/2012 |
| EP | 2286739 B1 | 1/2013 |
| EP | 2604195 A1 | 6/2013 |
| EP | 1492585 B1 | 6/2016 |
| EP | 2143387 B1 | 12/2016 |
| EP | 1647231 B1 | 11/2017 |
| FR | 2846868 A1 | 5/2004 |

(56) References Cited

FOREIGN PATENT DOCUMENTS

| | | |
|---|---|---|
| FR | 2941858 A1 | 8/2010 |
| JP | 2000316979 A | 11/2000 |
| JP | 2005519709 A | 7/2005 |
| JP | 2005524485 A | 8/2005 |
| JP | 2007069003 A | 3/2007 |
| JP | 2007513685 A | 5/2007 |
| JP | 2010502289 A | 1/2010 |
| JP | 2012517255 A | 8/2012 |
| JP | 2014527854 A | 10/2014 |
| WO | WO-03094785 A1 | 11/2003 |
| WO | WO-2007045229 A1 | 4/2007 |
| WO | WO-2008030403 A1 | 3/2008 |
| WO | WO-2010002291 A1 | 1/2010 |
| WO | WO-2010009291 A1 | 1/2010 |
| WO | WO-2010092291 A1 | 8/2010 |
| WO | WO-2011085234 A1 | 7/2011 |
| WO | WO-2011120047 A1 | 9/2011 |
| WO | 2013014353 A1 | 1/2013 |
| WO | WO-2013014355 A1 | 1/2013 |
| WO | WO-2013026474 A1 | 2/2013 |
| WO | WO-2014193949 A2 | 12/2014 |
| WO | WO-2017191500 A1 | 11/2017 |
| WO | WO-2017201504 A1 | 11/2017 |
| WO | WO-2018089773 A1 | 5/2018 |
| WO | 2019077218 A1 | 4/2019 |
| WO | WO-2020152640 A1 | 7/2020 |

OTHER PUBLICATIONS

International Search Report and Written Opinion from corresponding PCT Application No. PCT/FR2020/050889, Sep. 10, 2020.

Buhl S., et al., "Humidity Influence on the Adhesion of Biomimetic Fibrillar Surfaces", International Journal of Materials Research, 2009, vol. 100, No. 8, pp. 1119-1126.

Extended European Search Report for European Application No. 22170158.4, mailed Oct. 11, 2022, 8 pages.

International Search Report and Written Opinion dated Aug. 19, 2022 in Int'l PCT Patent Application Serial No. PCT/US2022/026558, 10 pages (0510).

International Search Report and Written Opinion dated Mar. 20, 2019 in Int'l PCT Appl. Serial No. PCT/FR2018/052388, 06 pages (0310).

International Search Report and Written Opinion dated May 7, 2010 in Int'l PCT Patent Application Serial No. PCT/FR2010/050210, 6 pages (0110).

International Search Report and Written Opinion dated Sep. 4, 2012 in Int'l PCT Patent Appl. Serial No. PCT/FR2012/051576 (0210), 7 pages.

Moon CM., et al., "Comparison of a Newly Designed Double-Layered Combination Covered Stent and D-Weave Uncovered Stent for Decompression of Obstructive Colorectal Cancer: A Prospective Multicenter Study", Dis Colon Rectum, 2010, vol. 53, pp. 1190-1196.

Shim CS., et al., "Through-the-Scope Double Colonic Stenting in the Management of Inoperable Proximal Malignant Colonic Obstruction: a Pilot Study", Endospcopy, 36(05):426-431 (May 2004).

Shomura Y., et al., "Composite Material Stent Comprising Metallic Wire and Polylactic Acid Fibers, and Its Mechanical Strength and Retrievability", Acta Radiol., May 2009, vol. 50, No. 4, pp. 355-359.

\* cited by examiner

[Fig. 1]
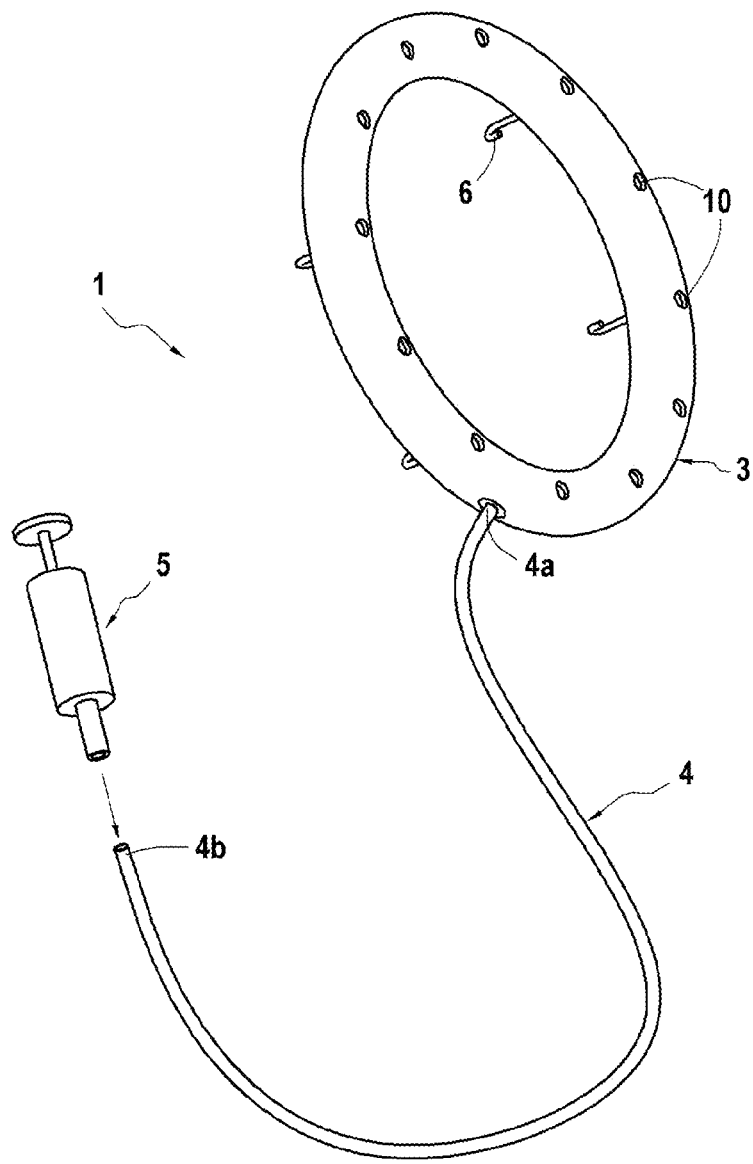
[Fig. 2]
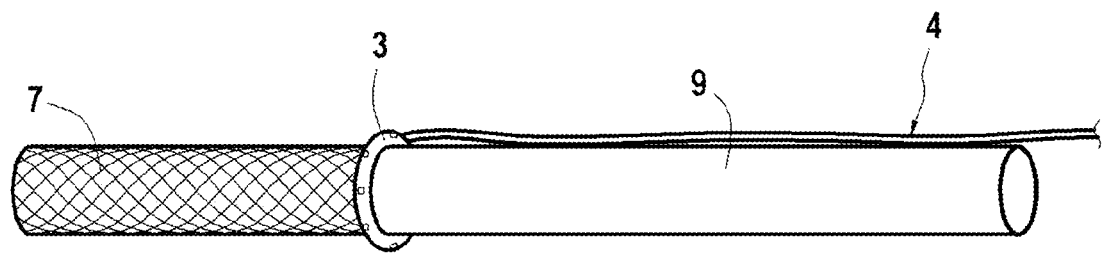

[Fig. 3]
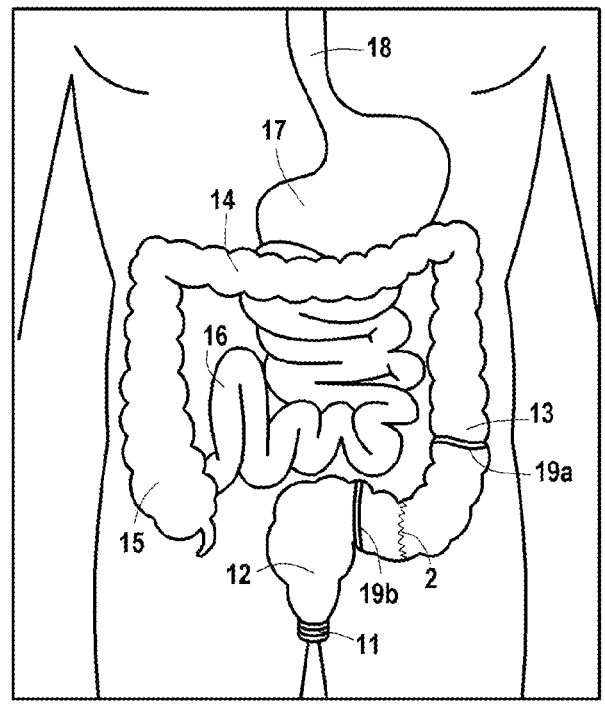
[Fig. 4]
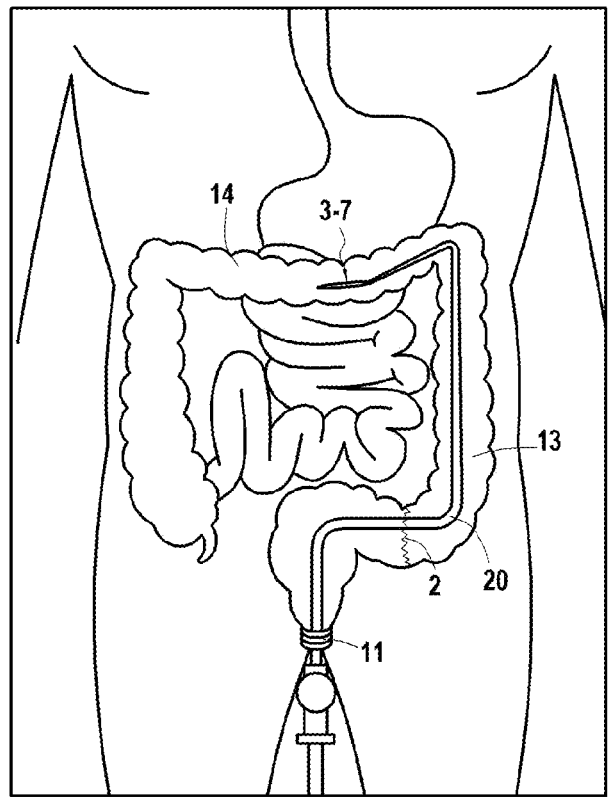

[Fig. 5]
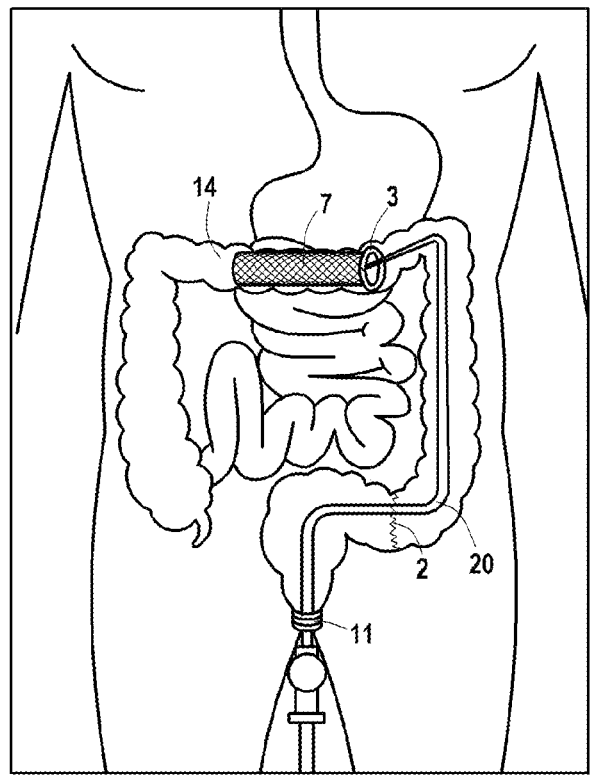
[Fig. 6]
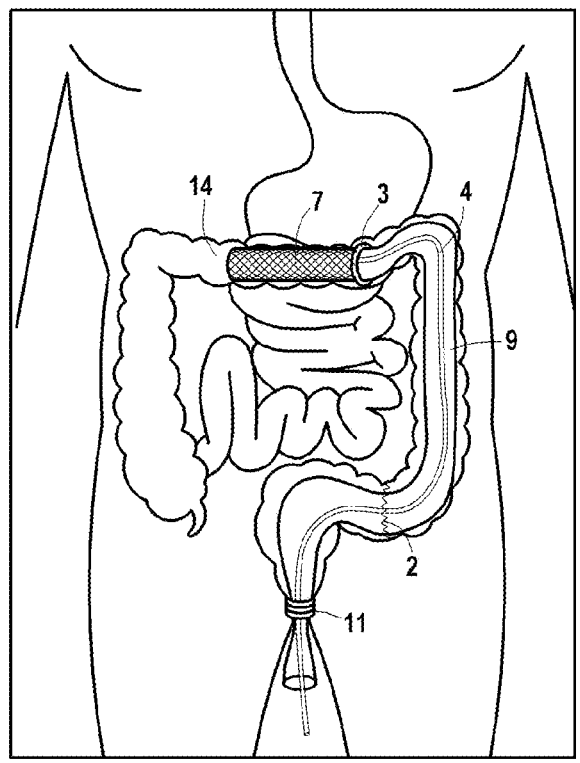

KIT FOR WASHING AN INTESTINAL ANASTOMOSIS IN SITU

TECHNICAL FIELD

The present invention relates to the field of the care of an anastomosis and concerns in particular a kit for intestinal anastomosis enema in situ.

PRIOR ART

Anastomoses are the connection between two structures, organs or spaces, by sutures or staples. An intestinal anastomosis, for example, is the union between two ends of a segment of the intestine that can especially occur after resection of a segment of the intestine. We can especially refer to anastomoses performed in the context of resection of a part of the colon in the case of colorectal cancer where a so-called low anastomosis is performed.

Anastomotic dehiscence (fistula) is a serious complication with a mortality of around 20%, in particular in cases of intestinal anastomosis, especially colorectal or coloanal anastomoses. Anastomotic fistulas are an abnormal communication of two cavities resulting in the discharge of the contents of one cavity into the other cavity.

Anastomotic fistulas are generally caused by poor healing of the anastomosis suture and generally occur a week after the operation. Symptoms can include fever, interruption of intestinal transit, more or less intense intestinal pain or even sceptic shock that can be life-threatening to the patient. In other cases, the patient may not have any symptoms.

Different treatments can be considered according to the severity of the anastomotic fistula, such as antibiotic therapy for less serious cases or even endoscopy or new surgery having higher risks than the first for the most serious cases.

Given the severe consequences that can be associated with intestinal anastomoses, in particular, there is a need to treat and/or prevent the therapeutic consequences related to performing an anastomosis, such as difficulty healing or even bacterial infections, and ultimately anastomotic fissures.

In order to prevent the appearance of anastomotic fistulas and more generally the therapeutic consequences related to performing an anastomosis, especially an intestinal one, it would be advantageous to be able to provide a technical solution making it possible to distribute, directly to the anastomosis and in a minimally-invasive way, a composition that can comprise one or more active compounds.

To do so, it could be advantageous to carry out regular repeated enemas of the anastomosis to facilitate healing thereof.

Currently-available solutions for intestinal anastomosis enema are generally implemented in a conventional way by anal route and require the introduction of an enema device during each enema and therefore repeated passage through the anastomosis or application of a liquid pressure in the area of the anastomosis, using an enema bucket, cannulated bulb, or simple pear.

Enemas may also be performed percutaneously. For example, by antegrade enema according to the Malone method, which requires a surgical procedure to create a stoma to create an access for the enema liquid, or even by percutaneous endoscopic cecostomy (PEC) which requires the creation of a cecostomy opening between the first part of the colon and the skin, for the introduction of the enema fluid. However, these percutaneous enemas are invasive techniques presenting medical risks for patients such as infections and inflammation. The various existing solutions for intestinal anastomosis enema are therefore invasive since they require either the repeated introduction of an enema device that risks damaging the anastomosis and impairing the healing thereof, thus promoting the appearance of anastomotic fistulas, or the creation of an opening in the patient's abdomen to make it possible to access the liquid without anal introduction. This is why the procedures for intestinal anastomosis enema, especially done repeatedly, are practically never used in the context of treatment and/or prevention of the therapeutic consequences related to performing an intestinal anastomosis.

The present invention therefore aims to offer a technical solution making it possible to treat and/or prevent the therapeutic complications related to performing an intestinal anastomosis and especially to prevent anastomotic fistulas, which is minimally invasive, making it possible to perform repeated enemas in situ that do not require multiple reintroduction in vivo of the enema device, effective and adaptable to the context of use.

The present invention targets the therapeutic complications related to performing an anastomosis generally, such as difficulty healing, bacterial infections, pain at the anastomosis site or even anastomotic fistulas. All these therapeutic complications should be able to be treated and/or prevented in an effective and minimally invasive manner.

To this end, the present invention proposes a kit for intestinal anastomosis enema in situ, making it possible to perform repeated enemas and not needing to be reintroduced during each enema.

DISCLOSURE OF THE INVENTION

One object of the invention concerns a kit comprising a device (1) for intestinal anastomosis enema (2) in situ, and an anastomosis protection device comprising a flexible external sheath (9) connected to a stent (7) located downstream of the sheath, said stent being designed to be anchored upstream of the anastomosis, the enema device (1) comprising a perforated, tubular element of annular shape (3) that can distribute an enema composition, upstream of the anastomosis, a supply tube (4) one end of which (4a) emerges in the tubular element and one end of which (4b) is open to injection means (5) designed to deliver the composition into said tubular element, holding means (6) for the tubular element upstream of the anastomosis.

BRIEF DESCRIPTION OF THE DRAWINGS

FIG. 1 shows device (1) for intestinal anastomosis enema according to the invention, said device comprising a perforated, tubular element of annular shape (3), a supply tube (4) one end of which (4a) emerges in the tubular element and one end of which (4b) is open to injection means (5) designed to deliver the composition into said tubular element and holding means (6) for the tubular element upstream of the anastomosis.

FIG. 2 schematically shows enema device (1) according to the present invention coupled to an anastomosis protection device comprising an anchoring element (7) and an external sheath (9) located at the downstream end of the anchoring element (7) in which the tubular element (3) of the enema device is attached at the downstream part of the anchoring element by holding means (6).

FIG. 3 shows a schematic view of the digestive system with an anastomosis (2) connecting the two ends of a removed segment of intestine (19a and 19b) in which is found the rectum (11), the anal canal (12), the left colon (13), the transverse colon (14), the right colon (15), the small intestine (16), the stomach (17) and the esophagus (18).

FIG. 4 shows a schematic view of an enema device (1) according to the invention coupled to the anastomosis protection device routed toward the position upstream of the anastomosis through an introducer tube (20), the tubular element (3) and the anchoring element (7) being in the radially retracted position on leaving the introducer, external sheath (9) and supply tube (4) still being housed inside the introducer tube.

FIG. 5 schematically shows an enema device (1) according to the invention coupled to a device for protecting the anastomosis partly positioned upstream of the anastomosis, the tubular element (3) and the anchoring element (7) to which it is attached being in the maximum radially expanded position held against the intestinal wall.

FIG. 6 schematically shows enema device (1) according to the invention coupled to the anastomosis protection device with the supply tube (4) of the enema device and external sheath (9) of the anastomosis protection device deployed downstream of the anchoring element (7) of the anastomosis protection device.

DESCRIPTION OF EMBODIMENTS

The Applicants have developed a device for intestinal anastomosis enema in situ. This device is particularly interesting to be able to distribute directly, in a repeated and minimally invasive way, a so-called enema composition upstream of an anastomosis, said composition being able to comprise one or more active compound(s), in order to treat and/or prevent therapeutic complications linked to performing an anastomosis.

A first object of the invention concerns a device (1) for intestinal anastomosis enema (2) in situ, said device comprising a perforated, tubular element of annular shape (3) that can distribute an enema composition, upstream of the anastomosis, a supply tube (4) one end of which (4*a*) emerges in the tubular element and one end of which (4*b*) is open to injection means (5) designed to deliver the composition into said tubular element, holding means (6) for the tubular element upstream of the anastomosis.

In particular, the device according to the present invention concerns a device for intestinal anastomosis enema in situ, said device being able to be maintained in situ during the period in which the anastomosis enemas are performed. In the context of the present invention, the positioning and maintenance in situ of the device also means in vivo since the objective of the invention is intestinal anastomosis enema.

This installation and maintenance in situ of the device according to the present invention during the period of anastomosis enema, advantageously makes it possible to perform anastomosis enema in a repeated and minimally invasive manner, since it makes it possible to avoid passing through the anastomosis during each enema that risks damaging and altering said anastomosis and, in particular, its suture.

Indeed, this installation does not require multiple passages of the device through the freshly-performed anastomosis. The device according to the present invention can actually be positioned before performing the anastomosis and using the excision of a pathological intestinal segment and the opening of the lumen of said segment required for the positioning of the device according to the invention. It can also be positioned after performing the anastomosis via the anus and only requires a single passage through the freshly-performed anastomosis. In both cases, the device will be maintained in situ throughout the period during which the repeated enemas are done.

The direct distribution of an enema composition upstream of the anastomosis makes it possible to have locally improved effectiveness of the enema implemented by the present device, in particular of the enema composition distributed for the treatment and/or prevention of therapeutic complications related to performing an anastomosis. More particularly, the device according to the present invention is designed for intestinal anastomosis enema, i.e., for an anastomosis performed in the intestines and preferably a so-called low intestinal anastomosis such as an anastomosis on the colon, rectum or anal canal, for example a colorectal or coloanal anastomosis, respectively corresponding to a connection between the colon and the rectum or between the colon and the anus.

In the context of the present invention, "enema" means the distribution of an enema composition over the anastomosis and, in particular, upstream of the anastomosis and in the direction of said anastomosis. The enema in the context of the invention can involve various types of enema compositions depending on the context of use of the device.

In the context of the invention, enema composition means any composition, preferably liquid, designed to be distributed upstream of the anastomosis and able to comprise one or more active compounds. The enema composition is chosen according to the context of use of the device.

Within the meaning of the invention, "context of use of the device" means the objective(s) of the implementation of the enema device according to the present invention, and more particularly, the objective(s) and the indications targeted by the distribution of an enema composition upstream of an anastomosis during the implementation of said device. The context of use of the device, i.e., the objectives of the implementation of the device, can be varied, such as cleaning the anastomosis, aiding healing and, more generally, the treatment and/or prevention of therapeutic complications related to performing an anastomosis.

Within the meaning of the present invention, "therapeutic complication(s)" means physical and/or physiological conditions or disorders that may follow or be related to performing an anastomosis and whose occurrence may be common and normal following this procedure or of a pathological nature. These conditions and disorders include bacterial and/or viral infection, pain at the anastomosis site, difficulty of healing of the anastomosis or even anastomotic fistulas.

"In vivo" here means inside a living subject, in particular in the intestines and even more particularly at the intestinal segment located upstream of the anastomosis.

Within the present invention, "in situ" refers to the position in vivo in which the device is installed and maintained during the period during which enemas are performed, more precisely, we refer to the intestinal segment located upstream of the anastomosis in which the device is installed and maintained during the period of performing the enemas. The device according to the present invention is therefore installed and maintained in vivo and in situ.

"Anastomotic protection" here means protecting the anastomosis during resumption of intestinal transit, on average occurring 3 to 5 days after performing the anastomosis. This period is the postoperative paralysis phase.

"Upstream of the anastomosis" refers to the position located before the anastomosis site considering the direction of intestinal transit, in particular the position located in front of the anastomosis and in which the device according to the invention is designed to be installed. The so-called position upstream of the anastomosis is comprised between 1 m and 1 cm, preferably between 50 cm and 15 cm, more preferably between 30 cm and 15 cm upstream of the anastomosis.

The holding means (6) for the tubular element in the context of the present invention comprise elements permitting directly or indirectly mounting the tubular element, upstream of the anastomosis and more precisely on the inner wall of the intestinal segment located upstream of the anastomosis.

In particular, the holding means (6) of the device according to the present invention are positioned on the tubular element.

The holding means (6) can be mounting elements such as loops, tabs or hooks, used singly or in combination.

Preferably, the holding means (6) comprise indirect mounting means for the perforated, tubular element of annular shape of the device according to the present invention on the inner wall of the intestinal segment located upstream of the anastomosis (2). More preferably still, the holding means of the device according to the present invention are able to be attached onto a temporary mounting element (7) such as a stent.

In particular, the holding means (6) of the device according to the present invention are able to be attached on a stent (7).

Preferably, the stent is comprised in a protection device for the intestinal anastomosis.

More preferably still, the holding means (6) according to the present invention are able to be attached on the stent (7) of an intestinal anastomosis protection device designed and able to be inserted and held in situ on the inner wall of the anatomical intestinal segment located upstream of anastomosis (2).

More particularly, the holding means (6) of the device according to the present invention are able to be attached on the stent (7) of an intestinal anastomosis protection device comprising a flexible external sheath (9) connected to said stent located downstream of the sheath, said stent being designed to be anchored upstream of the anastomosis. In the context of the present invention, the holding means (6) are therefore able to attach the tubular element (3) of the enema device on the stent (7) of the anastomosis protection device.

The device according to the present invention is called coupled or paired with the anastomosis protection device when the holding means (6) of the enema device are attached on the stent of the anastomosis protection device.

According to a first embodiment, the holding means attach the tubular element of the device according to the present invention onto the inner part of the stent of the anastomosis protection device.

According to another embodiment, the holding means (6) attach the tubular element of the device according to the present invention onto the outer part of the stent (7) of the anastomosis protection device.

According to a preferred embodiment, the holding means (6) attach the tubular element (3) of the device according to the present invention onto the downstream end of the stent (7) of the anastomosis protection device and preferably on the outer part of said stent. Preferably, in this embodiment, the holding means (6) are located near or around the inner diameter of the tubular element.

In each of these embodiments, the holding means (6) attach the tubular element (3) of the device according to the present invention to the outside of external sheath (9) of the anastomosis protection device in order to allow the enema composition to be directly distributed upstream of the anastomosis.

The anastomosis protection device onto which the holding means can be attached is an anastomosis protection device as described in the following patent documents FR 2 941 858, EP 2395942, WO2013/014353 or patent application WO2019/077218.

The intestinal anastomosis protection device onto which the holding means (6) can be attached, i.e., to which the device according to the present invention is coupled, is composed of a flexible external sheath (9) of one piece with a stent (7) downstream thereof, said stent being designed to be anchored upstream of the anastomosis. The stent is the element for temporary anchoring to the intestine wall, which holds the sheath in place and the sheath serves to divert fecal matter to the anus without contact with the intestinal wall at the anastomosis site and therefore to protect the anastomosis.

More precisely, the anastomosis protection device onto which the holding means (6) can be attached comprises a temporary anchoring element (7), comprising at least one first longitudinal, hollow, semirigid element of the stent type, defining a wall of revolution around a longitudinal axis comprising a substantially cylindrical multi-perforated main part of substantially circular section called the first wall, said first hollow longitudinal element being made of a material imparting properties of radial elasticity so that it can be compressed radially in the retracted position and adopt a so-called position of maximum radial expansion after release of the radial compression such that said first multi-perforated wall has a first outer diameter which can be varied in a controlled manner between a first minimum outer diameter in said retracted radial position of said first wall and a first maximum outer diameter in said position of maximum radial expansion of said first wall, and a flexible external sheath (9) attached to said stent and extending from its downstream end. These elasticity properties of the anchoring element of the anastomosis protection device make it possible to install and hold this device in situ upstream of the anastomosis and, consequently, the device according to the present invention which is connected to it and more particularly the perforated tubular element (3) of the device according to the present invention which also has elasticity properties.

The anastomosis protection device can also, on at least one part, preferably the entire length, of the inner surface of the anchoring element be lined with an independent watertight layer forming an internal sheath, only the longitudinal ends of said internal sheath being attached in a watertight manner to the anchoring element using watertight attachment means, such as an annular seal of elastomeric adhesive, at each longitudinal end of the internal sheath in order to delimit a chamber called a vacuum chamber between said internal sheath and the inner surface of the anchoring element, the anchoring element being coupled to a flexible or semi-rigid injection-suction tube extending outside of said anchoring element, one open end of said injection-suction tube opening into the vacuum chamber. The injection-suction tube is connected, preferably in a reversible manner, at its free longitudinal end to a connection end piece, itself connected in a reversible manner or able to be connected in a reversible manner to an air injection or suction device such as a syringe or redon, said connection end piece comprising a closure device, preferably an anti-reflux valve and a vacuum indicator device capable of indicating the vacuum content in said vacuum chamber. The air suction tube helps to maintain the anastomosis protection device in situ upstream of the anastomosis by suction of air from its free end, from the outside of the subject, to draw the intestinal wall by suction against the outer surface of the anchoring element delimiting the chamber and establish the vacuum in said chamber. The combination of the elasticity properties of the anchoring element of the anastomosis protection device and the air suction tube in the vacuum chamber present in said anchoring element ensures a firmer hold in situ upstream of the anastomosis of the anastomosis protection device and, consequently, the device according to the present invention to which it is coupled.

The device according to the present invention is preferably coupled to the anastomosis protection device before the installation in situ of the anastomosis protection device in order to facilitate and secure the installation of the device according to the present invention.

The device according to the present invention coupled to the anastomosis protection device can be installed in situ by an introducer device such as described in WO2013/014353.

More precisely, the introducer device useful in the context of the present invention may consist in a known manner of a semirigid guide tube (20) called an introducer tube, of the catheter type, provided at one of its ends with a handle and of which the inner diameter and the length of the guide tube make it possible to hold the anchoring element housed therein, therefore preferably the stent of the anastomosis protection device in its retracted form, and the sheath in the longitudinally deployed form. The introducer device is also able to stay housed in the perforated tubular element of annular shape of the device according to the present invention in the retracted form in said guide tube, and to hold the supply tube of the device in the longitudinally deployed form.

For anal introduction, especially after performing an intestinal anastomosis, the introducer device also comprises an introducer instrument comprising:—a tubular outer casing that can contain and hold the anchoring element and the tubular element compressed in retracted form within the distal end of said casing, and the external sheath and the supply tube in the longitudinally deployed form—means for routing the distal end of said introducer from the anus to upstream of the anastomosis and—means for disengaging the anchoring element and the tubular element with respect to the outer casing, which can consist of a stopper tube comprising a stopper at its distal end, in contact, where appropriate, with the longitudinal end of said anchoring element with the external sheath of the protection device located downstream of the anchoring element surrounding the stopper tube inside said envelope.

The means for routing the distal end of the introducer from the anus to upstream of the anastomosis can be a pusher extending from the handle connected to the end of the guide tube and comprising a pusher rod and a pusher stopper at the distal end of the pusher rod. The pusher stopper can push the protection device coupled to the enema device according to the invention at the outside of the distal end of the guide tube to allow their radial extension and anchoring of the anchoring element, especially the stent, against the intestine wall.

After withdrawing the introducer, the anchoring element such as the stent and the tubular element attached to it, open by radial extension and come to contact the intestine walls while the sheath, the supply tube and the suction tube are deployed in the lumen of the intestine from the anchoring site upstream of the anastomosis to the anus by crossing the anastomosis.

The device according to the present invention comprises a supply tube (4) designed to deliver the enema composition to perforated tubular element of annular shape (3). For this purpose, one end (4a) of the supply tube emerges in the tubular element and one end (4b) opens to injection means (5) designed to deliver the composition into said tubular element.

The end (4a) of the supply tube emerging in the tubular element (3) is attached to said element by watertight attachment means, preferably by fusion or by an annular seal of elastomer adhesive. The end (4b) opening toward injection means (5) designed to deliver the composition into said tubular element can open directly or indirectly to said injection means. When the end (4b) of the supply tube opens indirectly to injection means (5), said end is connected reversibly to a connecting piece, itself connected or able to be connected reversibly to the injection means such as a syringe or a pump.

In particular, the end (4b) of supply tube (4) which opens to injection means (5) is designed to be located outside the body.

More precisely, the end (4b) of the supply tube that opens to the injection means is located outside the body, i.e., ex vivo, when the tubular element (3) is installed upstream of the anastomosis.

According to a preferred aspect, the supply tube (4) is a flexible or semirigid tube.

In the context of the present invention, the supply tube (4) has an inner diameter which can be between 1 and 8 mm, preferably between 2 and 5 mm and more preferably the tube has an inner diameter less than or equal to 5 mm. The tube has an outer diameter comprised between 2 and 9 mm, preferably between 3 and 6 mm. A supply tube having an inner diameter less than or equal to 5 mm, advantageously makes it possible to ensure the delivery of the enema composition to the perforated tubular element of annular shape, especially small amounts of said composition.

The supply tube (4) according to the present invention has an initial length that can be adjusted after installation of the device and, in particular, of the tubular element in situ, so that the tube is sufficiently long for the end of the tube by which the composition is inserted to be found outside the body. According to a preferred aspect, the device according to the invention comprises a single supply tube.

Perforated, the tubular element of annular shape (3) of the device is able to distribute an enema composition upstream of the anastomosis so that said element is positioned, installed, upstream of the anastomosis. Positioning the perforated tubular device upstream of the anastomosis allows the composition to flow in the direction of the anastomosis until it reaches it. Preferably, the device according to the present invention comprises a single perforated tubular element of annular shape (3).

According to a particularly preferred aspect, the tubular element (3) of the device according to the present invention is made of a material that confers radial elasticity properties to it so that it can be radially compressed in the retracted position and adopt a maximum radial expansion position after release of the radial compression. These properties advantageously allow the tubular element to be able to adapt to variations of the diameter of the anchoring element of the protection device to which it is attached, especially while housed within the guide tube of the introducer device. In other words, the properties of radial elasticity of the perforated tubular element make it possible to hold this element in the retracted form so that it can be kept housed in the guide tube of the introducer device and return to its outer diameter at rest after installation in situ.

Perforated tubular element of annular shape (3) of the device according to the invention has at least one, preferably several perforations (10), said perforations being positioned on the circumference of said element and facing said anastomosis. Positioning perforations (10) facing the anastomosis allows the enema composition to easily flow in the direction of the anastomosis.

The tubular element of the device according to the present invention preferably comprises between 5 and 50, more preferably between 5 and 20 perforations.

Perforations (10) comprised in the tubular element can have a diameter comprised between 0.1 and 5 mm, preferably between 0.1 and 2 mm, more preferably between 0.5 and 1 mm. The number and/or the diameter of the perforations present in the tubular element vary according to the number or diameter of the perforations, or according to the distribution flow rate of the desired enema composition.

Preferably, the tubular element (3) according to the present invention comprises between 5 and 10 perforations (10) having a diameter that can range from 0.1 to 1 mm.

According to a particular aspect, the tubular element (3) of the device according to the present invention comprises multiple perforations (10) regularly spaced on the circumference of the tubular element. This configuration allows homogeneous distribution of the enema composition upstream of the anastomosis and in the direction thereof.

The outer diameter of the tubular element (3) before installation in situ, also called outer diameter at rest, can be comprised between 10 and 70 mm, preferably between 20 and 50 mm, more preferably between 20 and 40 mm and the inner diameter of the tubular element before installation in situ, also called inner diameter at rest, can be comprised between 15 and 65 mm, preferably between 25 and 45 mm, preferably between 35 and 40 mm.

The outer diameter of the tubular element (3) corresponds to the largest diameter formed by the walls of said element and the inner diameter corresponds to the smallest diameter formed by the walls of said element.

Preferably, the tubular element (3) has an outer diameter at rest comprised between 20 and 50 mm and an inner diameter at rest comprised between 15 and 40 mm.

When the tubular element (3) of the device is attached onto the outer part of the anchoring element (7) of the anastomosis protection device, the inner diameter at rest of the tubular element is similar to the outer diameter at rest of the anchoring element for the anastomosis protection device. Preferably, the inner diameter at rest of the tubular element and the outer diameter at rest of the anchoring element of the anastomosis protection device are adapted according to the diameter of the intestinal segment of the subject in whom they must be inserted.

The outer diameter and inner diameter of the tubular element (3) after installation in situ are substantially less than that of the outer and inner diameter at rest due to the pressure of the inner wall of the intestinal segment in which the element is installed and to the elasticity properties of the materials that make it up.

In particular, the device according to the present invention is of biocompatible material.

More precisely, the perforated, tubular element of annular shape (3), the supply tube (4) and the holding means (6) of the device according to the present invention are of biocompatible material.

"Biocompatible material" or "biomaterial" refers to a material having the ability to not interfere with or degrade the biological environment in which it is used, in direct or indirect, brief or prolonged contact with the internal tissues and fluids of the body of a human being or an animal. Examples of biocompatible materials which can be used in the context of the present invention include, in an non-exhaustive manner, metals and metal alloys such as titanium, platinum, nickel, polymers of natural origin such as collagen, agarose, chitosan, carrageenan, cellulose and derivatives thereof, xanthan and alginate or of synthetic origin such as polyesters, polyolefins, polyanhydrides, vinyl polymers, polyurethanes, polyamides, polyether amides, preferably thermosensitive polymers such as thermosensitive polyurethane (TSP) or thermosensitive polyether amide (TSP-A).

Preferably, the biocompatible material useful in the context of the present invention is chosen from among one or more materials including nickel-titanium metal alloy known under the name nitinol, thermosensitive polyurethane (TSP) and thermosensitive polyether amide (TSP-A).

More preferably, the biocompatible material composing the tubular element is chosen from among nickel-titanium metal alloy or thermosensitive polyether amide (TSP-A), more preferably thermosensitive polyether amide (TSP-A).

More preferably, the biocompatible material composing the supply tube is heat sensitive polyurethane (TSP).

More preferably, the biocompatible material composing the holding means for the tubular element is chosen from among nickel-titanium metal alloy or thermosensitive polyether amide (TSP-A), more preferably thermosensitive polyether amide (TSP-A).

The biocompatible material composing the tubular element and the supply tube of the device according to the present invention can be identical or different.

According to a particular aspect, the injection means (5) of the device according to the present invention comprise a syringe or a pump.

Injection means (5) comprised in the device according to the present invention are able to capture, puncture, recover, and suction the enema composition of the device according to the invention in the container or receptacle in which it is located.

The enema composition is designed to be inserted in the end (4*b*) of the supply tube (4) opening to injection means (5) to be delivered into the tubular element (3) and be distributed upstream of anastomosis (2). The composition is chosen as a function of the context of use of the device, i.e., the objective(s) of the anastomosis enema.

The enema composition in the context of the present invention is a dermatological composition designed and suitable to be applied on the intestinal mucosa.

In the context of the present invention, the enema composition can be an aqueous, alcoholic or hydroalcoholic solution or an emulsion which may comprise one or more active compound(s) and a pharmaceutically-acceptable excipient.

For example, the enema composition may be an emulsion obtained by dispersion of a fatty phase in an aqueous phase or vice versa.

This composition can be prepared according to all the methods well known to the skilled person.

In particular, the enema composition for the device according to the present invention is an aqueous, alcoholic or hydroalcoholic composition that can comprise one or more active compound(s) and a pharmaceutically-acceptable excipient.

According to a first embodiment, the enema composition for the device according to the present invention is an aqueous, alcoholic or hydro-alcoholic composition that can comprise one or more active compound(s) and a pharmaceutically-acceptable excipient. Preferably, the enema composition is an aqueous composition.

The enema composition can comprise several different or identical enema compounds.

In the context of the present invention, "active compound" refers to any compound that can have a pharmacological activity and/or a physiological effect in the subject to whom the composition comprising it is administered.

The active compound(s) included in the enema composition can be chosen from an antiseptic agent, an antibacterial agent, an antibiotic, an antiviral agent, an antiparasitic agent, an antifungal agent, an anti-allergenic agent, an immunosuppressive agent, an analgesic agent, an anesthetic agent, an anti-angiogenic agent, an anti-proliferative agent, an antiinflammatory agent, a wound-healing agent, a probiotic agent or a mixture of these compounds.

More particularly, the enema composition according to the invention comprises one or more active compound(s) chosen from an antiseptic agent, an antibacterial agent, an antiinflammatory agent, an analgesic agent and a healing agent.

More particularly still, the active compound(s) can be chosen from an antiseptic agent such as chlorhexidine, hexamidine, benzalkonium, benzyl alcohol, triclosan, iodine, an antibacterial agent such as butyrate, demeclocycline, chlortetracycline, oxytetracycline, tetracycline, chloramphenicol, fusidic acid, mupirocin, neomycin, an antiinflammatory agent such as butyrate, corticosteroids such as hydrocortisone prednisolone, clobetasol, desonide, triamcinolone, ketoprofen, diclofenac, benzydamine, ibuprofen, a wound-healing agent such as butyrate, hyaluronic acid, hyaluronic acid butyrate, sodium butyrate, dexpanthenol, trolamine, retinol or vitamin A, cadexomer, dextranomer, crilanomer, enoxolone, calcium pantothenate, an analgesic agent such as non-opioid analgesics such as diclofenac, ibuprofen, paracetamol or ketoprofen, stage II opioid analgesics such as tramadol or codeine or stage III opioid analgesics such as fentanyl, morphine, oxycodone or sufentanil.

This list of active compounds is given by way of example; the skilled person will know how to determine the active compounds that can be used in the context of the present invention.

The enema composition can comprise between 0.001 and 10% of active compound(s), preferably between 0.01 and 8%, preferentially between 0.1 and 5%, more preferentially between 0.1 and 3%, preferably between 0.1 and 2% and more preferably 2% by weight relative to the total weight of the composition.

According to a preferred aspect, the enema composition according to the present invention comprises 5% by weight of active compound(s) relative to the total weight of the composition.

According to a second embodiment, the enema composition for the device according to the present invention is an aqueous, alcoholic or hydroalcoholic composition not comprising an active compound, preferably the enema composition is an aqueous composition such as physiological saline in particular suitable when the objective of the enema is the cleansing of the anastomosis.

The composition according to the present invention can also comprise inert or pharmacodynamically-active additives, alone or in combination, such as solvents, wetting agents, stabilizing agents, surfactants, preservatives, pH regulating agents, vitamins, emulsifying agents, humectants, moisturizers, soothing agents, penetrating agents, antioxidants, cosmetically-active agents, electrolytes, conventional acids or bases or mixtures.

The skilled person will take care to choose the active compound(s), additives and pharmaceutical excipient according to the objective(s) of the enema and the desired form of the composition.

In the context of the present invention, the pharmaceutically-acceptable excipient is any compound other than the active compound and compatible with any other compounds present in the composition, compatible with the elements of the device with which it is in contact, and compatible with skin and mucosa, in particular the intestinal mucosa.

Within the meaning of the present invention, "subject" or "patient" means any mammal and especially human beings, men, women and children.

The enema composition of the device according to the present invention is designed to be contained in a receptacle suited to said composition and from which the injection means are able to collect it.

The objective(s) of the enema all have for a direct or indirect consequence the treatment and/or prevention of therapeutic complications related to performing an anastomosis and especially the prevention of anatomic fistulas.

In the context of the present invention, "to treat" or "treatment" means an improvement or reversal of a specified disease or disorder or at least a discernible or indiscernible symptom. The term "to treat" can also designate the reduction or slowing of the progression of the disease or disorder, or the onset of symptoms of this disease or disorder. For example, in the context of the present invention, the term "to treat" may correspond to the reduction or slowing of a therapeutic complication linked to performing an anastomosis such as a bacterial infection of the anastomosis, pain at the anastomosis site, difficulty in healing and/or reduction or slowing of the onset of anastomotic fistulas.

In the context of the present invention, "to prevent" or "prevention" means a reduction in the risk of acquiring a specified disease or disorder or reduction or slowing of the onset of symptoms of this disease. For example, in the context of the present invention, the term "to prevent" may correspond to the reduction of the risk of onset of a complication linked to performing an anastomosis such as a bacterial infection of the anastomosis, pain at the anastomosis site, difficulty in healing and/or reduction or slowing of the onset of anastomotic fistulas.

The present invention also concerns the use of the device according to the first object or a method to treat or prevent one or more therapeutic complications related to performing an anastomosis in a subject.

More particularly, the present invention concerns the use of the device according to the first object or a method to treat and/or prevent one or more therapeutic complications related to performing an anastomosis in a subject, in whom the device, in particular the tubular element of said device, is installed in situ upstream of said anastomosis, and the enema composition is inserted by injection means into the end of the supply tube of the device opening to said injection means to be distributed upstream of the anastomosis by means of said tubular element. The enema composition and the quantity of said composition are determined according to the therapeutic complication(s) targeted.

The present invention also concerns a device according to the first object for its use to treat or prevent one or more therapeutic complications related to performing an anastomosis in a subject.

More particularly, the present invention concerns a device according to the first object for its use to treat and/or prevent one or more therapeutic complications related to performing an anastomosis in a subject, in whom the device, in particular the tubular element of said device, is installed in situ upstream of said anastomosis, and the enema composition is inserted by injection means into the end of the supply tube of the device opening to said injection means to be distributed upstream of the anastomosis by means of said tubular element. The enema composition and the quantity of said composition are determined according to the therapeutic complication(s) targeted.

In the case of the abovementioned uses and methods, the holding means of the device according to the invention are attached onto the anchoring element, especially the stent, of an anastomosis protection device before its installation in situ. In other words, the device according to the present invention is coupled to the anastomosis protection device before its installation in situ.

Preferably, the device according to the present invention is installed upstream of the anastomosis after it is performed via the anus by an introducer device such as described in relation to the first object of the present invention. More precisely, the introducer device may consist of a semirigid guide tube, of the catheter type, provided at one of its ends with a handle and of which the inner diameter and the length make it possible to hold housed the anchoring element of the anastomosis protection device, therefore preferably the stent and the tubular element of the device according to the present invention, in their retracted form, and the sheath of the anastomosis protection device and the supply tube of the device according to the present invention deployed longitudinally.

Preferably, the device according to the present invention is installed upstream of the anastomosis immediately after the anastomosis is performed, i.e., at the end of the surgical procedure.

In the context of the abovementioned uses and methods, the device according to the present invention can be used alone or combined with the simultaneous or sequential administration of other medicinal compounds such as antibacterial agents, analgesic agents or healing agents, said compounds being able to be administered enterally such as orally or anally or parenterally such as intravenously or other.

In the context of the abovementioned uses or methods, the device, and in particular, the tubular element of said device is installed upstream of said anastomosis at a distance comprised between 20 and 5 cm, preferably between 15 and 10 cm of the area where the anastomosis must be performed.

In the context of the abovementioned uses or methods, the enema composition is distributed repeatedly upstream of the anastomosis one or more times a day, preferably at least once a day, over an appropriate period for the enema objective.

The appropriate enema period can be comprised between 1 day and 3 weeks, preferably 1 day and 15 days, more preferably 9 days. Preferably in the context of the abovementioned uses and methods, the enema composition is distributed upstream of the anastomosis once a day for 9 days counting from the second day following the performance of the anastomosis.

In the context of the abovementioned uses or methods, different enema compositions can be distributed upstream of the anastomosis, simultaneously or at different times with a delay between each implementation.

The skilled person will know to determine the treatment and/or prevention parameters to implement such as the quantity of the enema composition to insert, the frequency of administration, the active compound(s) present in the composition, the dosage of each active compound and the form of the composition.

The present invention also concerns a method for installation upstream of an anastomosis in which:
- the enema device (1) according to the first object is coupled to the anastomosis protection device, in particular the tubular element (3) of the device according to the invention is attached to anchoring element (7) of the anastomosis protection device.
- the tubular element (3) of the device according to the present invention and the anchoring element (7) of the anastomosis protection device are housed in the retracted form within the distal end of semirigid guide tube (20) of an introducer device consisting of said tube provided with a handle at one of its ends.
- the distal end of the guide tube of the introducer device is introduced from the anus to upstream of the anastomosis by appropriate means.
- the anchoring element and the tubular element are freed from the guide tube by appropriate means.

The means for routing the anchoring element and the tubular element from the anus to upstream of the anastomosis can be a pusher extending from the handle connected to the end of the guide tube and comprising a pusher rod and a pusher stopper at the distal end of the pusher rod. Since the pusher stopper can release the anchoring element and the tubular element by pushing them outside of the distal end of the guide tube to allow their radial extension and anchoring of the anchoring element, especially the stent, against the intestine wall.

Preferably, the installation method is implemented immediately after the anastomosis is performed, i.e., at the end of the surgical procedure.

The enema device according to the present invention is removed at the end of the enema period chosen by an endoscopic technique using an endoscopic forceps. More precisely, the anchoring element, i.e., the stent (7) of the anastomosis protection device to which tubular element (3) of the device according to the invention is coupled is in detached from the intestinal wall by the upstream end of the stent in a first step and then is removed by the downstream end of the stent from the subject's body via the anus.

The present invention also concerns a kit comprising device (1) according to the first object of the invention, comprising injection means (5) and an anastomosis protection device comprising a flexible external sheath (9) connected to a stent (7) located downstream of the sheath, said stent being designed to be anchored upstream of the anastomosis. Preferably, the kit also comprises an enema composition.

Preferably, the kit according to the invention comprises the device according to the first object of the invention comprising a perforated tubular element of annular shape able to distribute an enema composition upstream of the anastomosis, a supply tube of which one end emerges into the tubular element and the other end opens to the injection means designed to deliver the composition into said tubular element, holding means for the tubular element upstream of the anastomosis, injection means for an enema composition and a device for protecting the anastomosis comprising an external sheath connected to a stent located downstream of the sheath, said stent being designed to be anchored upstream of the anastomosis.

The injection means (5) can be a syringe or a pump, preferably a syringe.

In particular, the kit according to the present invention also comprises a receptacle comprising an enema composition ready to be inserted by the free end of the tube of the device according to the first object.

According to a preferred aspect, the kit according to the present invention comprises the device according to the first object of the invention coupled to the anastomosis protection device, i.e., in which the tubular element (3) of the device according to the present invention is attached by holding means (5) onto the anchoring element (7) of the anastomosis protection device.

Preferably, the kit according to the present invention also comprises an introducer device able to insert the device according to the present invention coupled to the anastomosis protection device, upstream of the anastomosis. The introducer device may consist of a semirigid guide tube (20), of the catheter type, provided at one of its ends with a handle and of which the inner diameter and the length make it possible to hold housed the anchoring element of the anastomosis protection device, therefore preferably the stent and the tubular element of the device according to the present invention, in their retracted form, and the sheath of the anastomosis protection device and the supply tube of the device according to the present invention deployed longitudinally.

The kit according to the present invention comprises the tubular element (3) of the device according to the present invention and the anchoring element (7) of the anastomosis protection device in the retracted form within guide tube (20) of the introducer device.

The invention will be further illustrated by the following figures. However, these figures should not in any case be interpreted as limiting the scope of the invention.

The invention claimed is:

1. A kit for performing an intestinal anastomosis enema in situ in an intestine having an anastomosis, the kit comprising:
    an anchor configured to be anchored within the intestine upstream of the anastomosis;
    a sheath coupled to the anchor, the sheath configured to extend downstream from the anchor and across the anastomosis to thereby protect the anastomosis; and
    an enema device comprising a perforated, annularly shaped tube configured to distribute an enema composition, the perforated, annularly shaped tube configured to be positioned in the intestine upstream of the anastomosis, the enema device further comprising a supply tube having a first end coupled to the perforated, annularly shaped tube and a second end configured to receive an injection of the enema composition for delivery into the perforated, annularly shaped tube upstream of the anastomosis such that the enema composition flows downstream to the anastomosis.

2. The kit of claim 1, wherein the perforated, annularly shaped tube comprises loops, tabs, or hooks positioned on the perforated, annularly shaped tube.

3. The kit according to of claim 1, wherein the anchor comprises a stent configured to contact the intestine's wall for anchoring.

4. The kit of claim 1, wherein the supply tube of the enema device has an inner diameter between 1 and 8 mm.

5. The kit of claim 1, wherein the perforated, annularly shaped tube of the enema device comprises multiple perforations regularly spaced around a circumference of the perforated, annularly shaped tube.

6. The kit of claim 1, wherein the enema device is formed of biocompatible material.

7. The kit of claim 1, wherein the second end of the supply tube is configured to be coupled to a syringe or a pump for delivering the enema composition.

8. The kit of claim 1, wherein the kit comprises the enema composition.

9. The kit according to of claim 1, wherein the perforated, annularly shaped tube is coupled to the anchor.

10. The kit of claim 1, wherein the perforated, annularly shaped tube is positioned at a downstream end of the anchor.

11. The kit of claim 1, wherein the anchor comprises a vacuum chamber configured to maintain a vacuum for anchoring within the intestine.

12. The kit of claim 11, wherein the supply tube is separate from a suction tube configured to apply suction to the vacuum chamber.

13. The kit of claim 1, wherein the sheath is configured to divert fecal matter to the anus such that the fecal matter does not contact the intestine at the anastomosis to thereby protect the anastomosis.

14. The kit of claim 1, wherein the enema device is configured to deliver the enema composition over an enema period between 1 day and 3 weeks.

15. A method for performing an intestinal anastomosis enema in situ in an intestine having an anastomosis, the method comprising:
    anchoring an anchor within the intestine upstream of the anastomosis, the anchor coupled to a sheath that extends downstream from the anchor across the anastomosis to thereby protect the anastomosis; and
    delivering an enema composition from an enema device comprising a perforated, annularly shaped tube positioned in the intestine upstream of the anastomosis via a supply tube coupled to the perforated, annularly shaped tube such that the enema composition flows downstream to the anastomosis.

16. The method of claim 15, wherein the perforated, annularly shaped tube is coupled to a downstream end of the anchor.

17. The method of claim 15, wherein delivering the enema composition comprises injecting the enema composition into an externally-positioned end of the supply tube.

18. The method of claim 15, wherein anchoring the anchor comprises applying suction to a vacuum chamber of the anchor to suck the intestine against the anchor.

19. The method of claim 15, further comprising diverting, via the sheath, fecal matter to the anus such that the fecal matter does not contact the intestine at the anastomosis to thereby protect the anastomosis.

20. The method of claim 15, wherein delivering the enema composition comprises delivering the enema composition over an enema period between 1 day and 3 weeks.

* * * * *